Oct. 15, 1963 C. VAN DER LELY 3,107,103
TRACTOR HAVING TWO TANDEM STEERING WHEELS
Original Filed Jan. 25, 1957
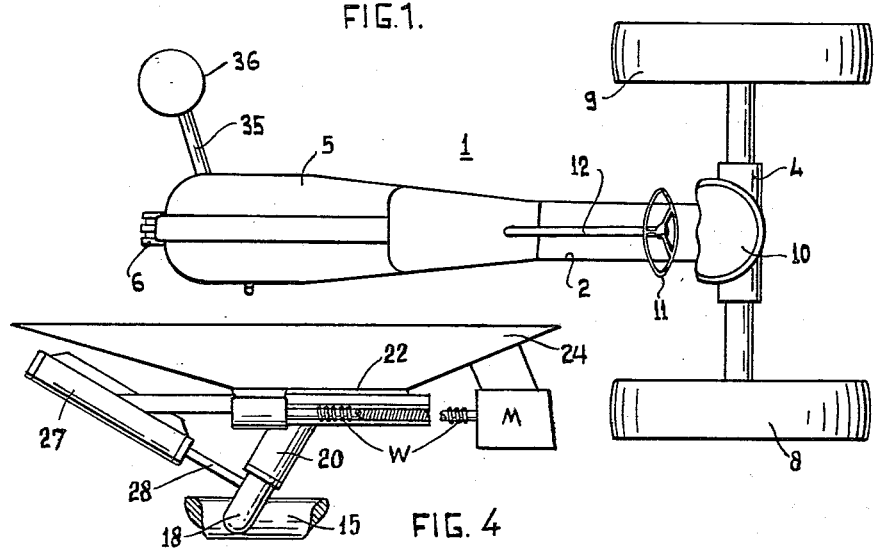
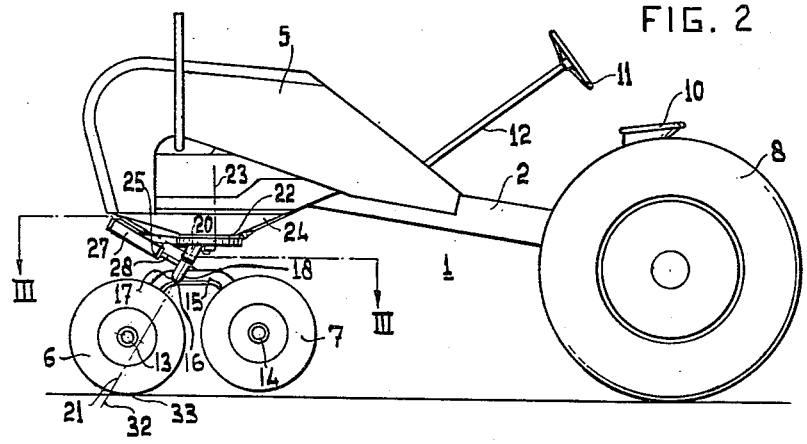
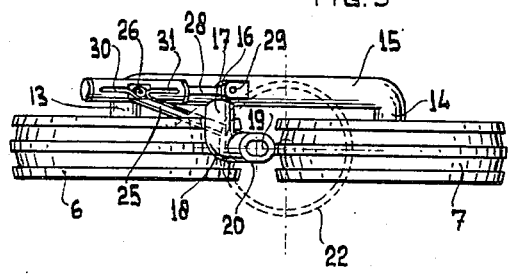

United States Patent Office 3,107,103
Patented Oct. 15, 1963

3,107,103
TRACTOR HAVING TWO TANDEM
STEERING WHEELS
Cornelis van der Lely, 7 Brüschrain, Zug, Switzerland
Continuation of application Ser. No. 636,414, Jan. 25,
1957. This application Apr. 19, 1961, Ser. No. 104,184
10 Claims. (Cl. 280—87)

This invention relates to tractor-like vehicles of the type having two steerable wheels.

Vehicles of this kind are generally known, as are vehicles having only one steerable wheel.

Vehicles having only one steerable wheel are useful because of their simplicity and for other reasons. However, vehicles with two steerable wheels have the advantage the irregularities in the surface traversed produce fewer shocks, since the vehicle weight, which must otherwise be borne by the steerable wheels in order to insure control of the vehicle, can be distributed between two wheels which generally will not move at the same time over the same irregularity.

The invention has as an object the provision of a vehicle which unites the advantages of a vehicle having two steerable wheels with those of a vehicle having one steerable wheel.

To this end, there is provided, according to the invention, a vehicle having steerable wheels which support part of the weight of the vehicle, the steerable wheels being arranged one behind the other, with reference to the intended direction of travel of the vehicle, and being so mounted on the vehicle as to be immovable relative to the latter in a vertical direction, there being further provided a steering mechanism for steering said wheels.

The wheels may be resiliently mounted on the vehicle, but a horizontal tilting shaft about which the wheels can be displaced in a vertical direction with respect to the vehicle is absent. With this structure the distance between the wheel axles is, even where the wheels are of small diameter, sufficient to insure that the two wheels will not generally encounter the same irregularity at the same time. The use of two small wheels as permitted by the invention is important, for example, with tractors and other agricultural machinery, since the small diameters of the wheels permit them to be disposed below the chassis. As a result, when the improved vehicle is used in a field with plants arranged in rows, the wheels leave only a single rut, which is less harmful to the soil than the two ruts which would result from a different arrangement.

The use of two steerable wheels, one behind the other, compared with the provision of only one steerable wheel, results in mitigation of shocks, reduced wear, smaller ground resistance and hence a reduced comsumption of fuel.

Moreover, for example, with tractors, heavier machinery can be coupled to the side of the tractor or in front of it without the risk of the tractor sinking into the soil.

For a better understanding of the invention and to show how the same may be carried into effect, reference will now be made to the accompanying drawings in which:

FIGURE 1 is a plan view of a tractor provided in accordance with the invention;

FIGURE 2 is a side view, in part, of the tractor; and

FIGURE 3 is an enlarged cross-sectional view of the tractor, illustrating the structure omitted in FIG. 2 and taken along line III—III of FIG. 2; and FIGURE 4 illustrates, on enlarged scale, a detail of the apparatus provided in accordance with the invention for varying the position of the steerable wheels.

This application is a continuation of my application Serial No. 636,414 filed January 25, 1957, now abandoned.

In FIGS. 1–4 is shown a tractor 1 having a chassis beam 2, which is coupled at its rearmost end to a back axle structure 4. At its front end, the beam 2 supports a motor 5 and is itself supported by a set of two steerable running wheels 6 and 7. The back axle 4 carries a set of driven laterally spaced wheels 8 and 9, which are fixed relative to the chassis beam 2 and are not steerable. The tractor 1 is further provided with a driver's seat 10 and a steering wheel 11, which is mounted on a steering column 12.

The steerable wheels 6 and 7 are detachably mounted on axles 13 and 14, which are rigidly secured to one another by means of a bar 15 in such a way that the axles 13 and 14 are always parallel to one another and are maintained in fixed relative positions. At portion 16, the bar 15 has secured to it the lower end of a rod 18 which is formed with a substantially right-angle bend. The upper end or pivot shaft 19 of the rod 18 is thinner than the lower end 17 and is mounted for rotation in a sleeve 20, the center line 21 of which constitutes a pivot axis for the wheels 6 and 7.

The line 21 lies at an angle of about 25° to the perpendicular and is positioned in the plane of symmetry of the wheels 6 and 7. The sleeve 20 is mounted on a horizontal disc 22 which is rotatable about a vertical axis of rotation 23, the disc 22 being rotatably secured to the chassis 24 which, in turn, is rigidly secured to the chassis beam 2.

The disc 22 is formed at its periphery with teeth which engage with a worm wheel (W), the worm wheel being selectively driven by means of an auxiliary motor (M). By operating the auxiliary motor which is controlled by a switch (not shown), the disc can be turned from the position shown in FIGURE 2 through 180° about the axis 23.

The disc 22 supports an arm 25, to which is pivotally connected an oil-pressure cylinder 27. The cylinder 27 contains a piston (not shown), the piston rod 28 of which is coupled to the bar 15 by means of a pivot 29. The pivot axis or center line 21 is spaced from the center line of the cylinder 27 so that when liquid under pressure is supplied to the cylinder 27, selectively through a duct 30 or a duct 31 the piston is caused to move backwards or forwards in the cylinder 27, the running wheels 6 and 7 are turned from the central position shown in the drawing, either to the right or to the left.

The supply of pressure liquid is controlled by means (not shown) which, in turn, is controlled by the steering wheel 11.

The above construction in which the pivot axis 21 is at an angle to the vertical has the advantage that, when the tractor is steered while travelling, the steerable wheels are brought from vertical to an oblique position, so that an amplified lateral force is exerted on the ground and thus the risk of skidding is reduced. Generally, if the two steerable wheels are in their central position and are in contact with the ground, one of the wheels will be raised from contact with the ground when the axles of the wheels are turned about an oblique axis. By virtue of the bar 15, the axles of the two wheels are so disposed, as to be immovable relative to one another, and this is preferable where the tractor has to travel over uneven ground and in order to obtain a simple chassis structure. At the same time, additional wear owing to non-alignment of the wheels when the tractor travels around curves is minimized.

In the central position of the wheels 6 and 7, the center line 21 intersects the ground at a point 32, which is near the point 33 where the wheel 6 contacts the ground, but which is on the side remote from the wheel 7, thereby facilitating the steering of the tractor. Under normal circumstances, the wheel 7 is, in the central position, either raised from the ground or bears on the ground with less pressure than the wheel 6, thereby insuring that steering of the tractor does not require great force while, on uneven ground, the advantage of the provision of two wheels is substantially maintained.

For driving the tractor in reverse, the pivot axis 21 can be turned through 180° about the vertical, so that driving in reverse is facilitated, since the position of the points of interesection of the axis 21 with the wheels and the direction of travel is, in this case, the same as that when driving in forward direction. Thus, by turning the disc 22 through 180° about the vertical axis 23, the tractor can be employed in either of two operational conditions, one with a large wheel base length, and one with a comparatively small wheel base length, the tractor being more maneuverable in the latter case.

Since the distances of the axles 13 and 14 from the axis 23 are unequal (as can be seen from FIGURE 2) the effective wheel base length of the tractor can be shortened by turning the disc 22 through an angle of 180° about the axis 23. A greater shortening of the effective wheel base length can be obtained by dismounting the wheel 7 when the wheels are in the position obtained by turning the disc through 180° from the position shown in FIGURE 2. This may be particularly important, when the tractor has to be driven backwards for a comparatively long distance.

Due to the small width of the steerable wheels 6 and 7, the tractor shown in FIGURES 1 to 3 may be small and compact in construction, and it will be possible to arrange a machine on the tractor such as, for example, an earth borer 36 which is secured to the tractor by means of an arm 35. If desired, the machine may be driven by the tractor motor.

It will be noted that the steerable wheels are arranged so that, in the position of these wheels on which the tractor travels along a straight line, the axis of rotation of wheel 7 is as close to the ground as it approaches assuming the tractor to be moving on a flat surface.

There will now be obvious to those skilled in the art many modifications and variations of the structure set forth above. These modifications and variations will not, however, depart from the scope of the invention if defined by the following claims.

What is claimed is:

1. An agricultural tractor comprising a chassis, a first set of laterally spaced running wheels operatively associated with said chassis and supported in fixed relationship with respect thereto, a second set of two steerable running wheels having respective axes of rotation and arranged behind one another in fixed relative positions, first means supporting the second set of wheels on said chassis for rotation about a substantially vertical axis with the wheels of the second set spaced different distances from said vertical axis, and second means coupled to said first means for rotating the second set of wheels through an angle of about 180° about said vertical axis, said first means including a member rotatable about said vertical axis and an inclined pivot shaft on said member supporting the wheels of said second set.

2. A tractor as claimed in claim 1, comprising means coupled to said pivot shaft to rotate the same.

3. A tractor as claimed in claim 1, wherein the steerable wheels are coplanar.

4. A tractor as claimed in claim 1, wherein the steerable wheels selectively provide different wheel bases with the laterally spaced wheels when rotated said 180°.

5. A tractor as claimed in claim 1, wherein said pivot shaft defines an axis which intersects the ground near the contact with the ground of one of said steerable wheels.

6. A tractor as claimed in claim 1, wherein one of said steerable wheels is supported at a higher level than the other of said steerable wheels.

7. An agricultural tractor comprising a chassis, a first set of laterally spaced running wheels operatively associated with said chassis and supported in fixed relationship with respect thereto, a second set of two steerable running wheels having respective axes of rotation and arranged behind one another in fixed relative positions, means supporting the second set of wheels on said chassis for rotation about an inclined pivot axis for steering the vehicle, said pivot axis intersecting the ground near the contact with the ground of one of the steerable wheels, the other steerable wheel being situated below said pivot axis, said axis of rotation of said running wheels being respectively located on opposite sides of the pivot axis, said second set of wheels being supported by said means with the rearmost of the second set of wheels at a higher level than the foremost of the second set of wheels.

8. An agricultural tractor comprising support means, a first set of laterally spaced running wheels operatively associated with said support means, a second set of running wheels on said support means, means supporting the wheels of said second set from said support for common revolution about a common axis to provide steering for said tractor, said wheels being supported by said means for individual rotation about respective axis which are independent of and spaced from said common axis, said wheels of the second set being supported in a normal relationship in which the rearmost of the latter said wheels is higher than the foremost wheel.

9. A tractor as claimed in claim 8, wherein the wheels of said second set are coplanar.

10. An agricultural tractor comprising a chassis, a first set of laterally spaced running wheels operatively associated with said chassis and supported in fixed relationship with respect thereto, a second set of two steerable running wheels having respective axes of rotation and arranged behind one another in fixed relative positions, means supporting said steerable wheels for rotation about an inclined pivot axis for steering the vehicle, one of said steerable wheels being supported at a higher level than the other of said steerable wheels, the axis of rotation of the higher steerable wheel lying below the pivot axis with the steerable wheels positioned to cause said tractor to travel in a straight line whereby the axis of rotation of the higher steerable wheel will be raised as the steerable wheels are rotated about said inclined pivot axis.

References Cited in the file of this patent

UNITED STATES PATENTS

| 1,738,784 | McCollough | Dec. 10, 1929 |
| 2,015,891 | Greiner et al. | Oct. 1, 1935 |
| 2,197,273 | Lindeman | Apr. 16, 1940 |

FOREIGN PATENTS

| 738,018 | France | Oct. 10, 1932 |